US011375264B2

(12) United States Patent
Alarcon et al.

(10) Patent No.: US 11,375,264 B2
(45) Date of Patent: Jun. 28, 2022

(54) VEHICLE COMMUNICATION SYSTEM

(71) Applicants: Jeysson Alarcon, Chicago, IL (US); Nicolas Alarcon, Chicago, IL (US)

(72) Inventors: Jeysson Alarcon, Chicago, IL (US); Nicolas Alarcon, Chicago, IL (US)

( * ) Notice: Subject to any disclaimer, the term of this patent is extended or adjusted under 35 U.S.C. 154(b) by 0 days.

(21) Appl. No.: 16/951,173

(22) Filed: Nov. 18, 2020

(65) Prior Publication Data

US 2021/0250637 A1 Aug. 12, 2021

Related U.S. Application Data

(60) Provisional application No. 62/975,289, filed on Feb. 12, 2020.

(51) Int. Cl.
| | | |
|---|---|---|
| *H04N 21/4223* | (2011.01) | |
| *G06F 1/3287* | (2019.01) | |
| *H04N 7/18* | (2006.01) | |
| *H04N 7/14* | (2006.01) | |

(52) U.S. Cl.
CPC ....... *H04N 21/4223* (2013.01); *G06F 1/3287* (2013.01); *H04N 7/142* (2013.01); *H04N 7/181* (2013.01)

(58) Field of Classification Search
CPC .... H04N 21/4223; H04N 7/181; H04N 7/142; G06F 1/3287
See application file for complete search history.

(56) References Cited

U.S. PATENT DOCUMENTS

| | | | | |
|---|---|---|---|---|
| 5,905,434 | A | * | 5/1999 | Steffan ............... B60Q 1/50 116/28 R |
| 6,300,870 | B1 | * | 10/2001 | Nelson ............. B60Q 1/503 340/471 |
| 7,020,992 | B1 | * | 4/2006 | Christie ............. G09F 21/04 40/593 |
| 8,934,062 | B1 | * | 1/2015 | Bosarge .......... B60R 11/0235 348/837 |
| 9,135,842 | B1 | * | 9/2015 | Riley .............. G09F 21/048 |
| 2006/0059745 | A1 | | 3/2006 | Maqui et al. |
| 2011/0258895 | A1 | | 10/2011 | Rodgers, Jr. |
| 2011/0295697 | A1 | | 12/2011 | Boston et al. |
| 2014/0005860 | A1 | * | 1/2014 | Chance ............. B60Q 1/503 701/2 |
| 2014/0111323 | A1 | | 4/2014 | Strout et al. |
| 2017/0075388 | A1 | * | 3/2017 | Yee ................. G06F 1/1652 |
| 2019/0018636 | A1 | * | 1/2019 | Kong ............... G06Q 50/30 |
| 2020/0394940 | A1 | * | 12/2020 | Thompson ........... G09F 7/10 |

* cited by examiner

*Primary Examiner* — Richard A Hansell, Jr.
(74) *Attorney, Agent, or Firm* — Boudwin Intellectual Property; Daniel Boudwin

(57) ABSTRACT

A vehicle communication system is provided. The system includes a housing having a first portion slidably affixed to a second portion. A first display is affixed between a first upper arm and a first lower arm of the first portion. A second display is affixed between a second upper arm and a second lower arm of the second portion. The first display and the second display are disposed along distinct parallel planes, such that the first portion and the second portion can selectively move between an extended position and a collapsed position. A fastener is disposed on each of the first end of the housing and a second end of the housing. A control circuit includes a power supply, a processor, and a memory disposed within the housing, and wherein the first and second displays can display a message stored on the memory across the first and second displays.

16 Claims, 3 Drawing Sheets

VEHICLE COMMUNICATION SYSTEM

CROSS REFERENCE TO RELATED APPLICATIONS

This application claims the benefit of U.S. Provisional Application No. 62/975,289 filed on Feb. 12, 2020. The above identified patent application is herein incorporated by reference in its entirety to provide continuity of disclosure.

BACKGROUND OF THE INVENTION

The present invention relates to a vehicle communication system. More particularly, the present invention pertains to a vehicle communication system having a pair of displays affixed within a housing removably securable to a rear vehicle window, wherein the pair of displays are configured to display a message to other drivers.

Proper communication on the roadway can be vital to protecting other drivers and ensuring minimal risk of collisions. However, communicating with other drivers can be particularly difficult or limited. For example, when a driver wishes to change lanes, the driver typically first signals that they intend to merge into an existing lane via turn signals or hand signals. Once within the new lane, properly thanking the other driver for creating space can be difficult to convey. Failing to properly communicate in such circumstances may result in a collision if the movement is not properly signaled. Additionally, other drivers can become incensed if they believe that such driving was overly aggressive or intentionally offensive, potentially leading to road rage incidents.

In other circumstances, emergency situations may go unnoticed by other drivers, thereby delaying assistance. For example, medical emergencies such as heart attacks, strokes, pregnancies, or the like, in which an individual may drive in a manner otherwise deemed reckless, can be communicated to other drivers to either make them aware of the potential of reckless driving, or to allow individuals to call emergency services to assist. In cases with medical emergencies, such delays can result in severe injury or death. Alternatively, roadside emergencies can range from routine to potentially deadly, however such situations are typically only marked by flares or the like. Being capable of fully communicating the severity of the roadside emergency can facilitate rapid response from emergency services, thereby minimizing the danger associated with the emergency. Therefore, a device that can readily inform other drivers of a particular message the user desires to convey, such as thanking a driver for making space for merging, informing other drivers of an emergency, or the like is desired.

In light of the devices disclosed in the known art, it is submitted that the present invention substantially diverges in design elements from the known art and consequently it is clear that there is a need in the art for an improvement to existing vehicle communication systems. In this regard, the instant invention substantially fulfills these needs.

SUMMARY OF THE INVENTION

In view of the foregoing disadvantages inherent in the known types of vehicle communication systems now present in the known art, the present invention provides a vehicle communication system wherein the same can be utilized for providing convenience for the user when displaying a message for other drivers in the vicinity and of the primary vehicle.

The present system comprises a housing having a first portion slidably affixed to a second portion. A first display is affixed between a first upper arm and a first lower arm of the first portion. A second display is affixed between a second upper arm and a second lower arm of the second portion. The first display and the second display are disposed along distinct parallel planes, such that the first portion and the second portion can selectively move between an extended portion and a collapsed position. A fastener is disposed on each of a first end of the housing and a second end of the housing. In some embodiments, the fastener is pivotally affixed to the first and second end. A control circuit is disposed within the housing, wherein the control circuit includes a power supply, a processor, and a memory. The first and second displays are configured to display a message stored on the memory across the first and second displays.

In some embodiments, the control circuit further comprises a wireless transceiver in operable communication with an external device, wherein the external device is configured to select a message from the memory to display. In another embodiment, the memory is configured to receive a message input from the external device, wherein the message input is transmitted to the display. In other embodiments, the external device further comprises a voice control system configured to translate a voice command into a message input for display. In yet another embodiment, the fastener comprises a suction cup. In some embodiments, a camera is disposed on the first upper arm of the housing, wherein the camera is operably connected to the control circuit. In another embodiment, the camera is configured to transmit images and video recorded thereby to an external device. In other embodiments, a connection port is disposed on the housing, wherein the connection port is configured to operably connect the housing to an external device. In yet another embodiment, a portion of the first display is positioned behind the second display when the housing is in the collapsed position. In some such embodiments, a sensor is operably connected to the control circuit and detects a length of the portion of the first display disposed behind the second display, such that the portion can be disabled by the control circuit.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
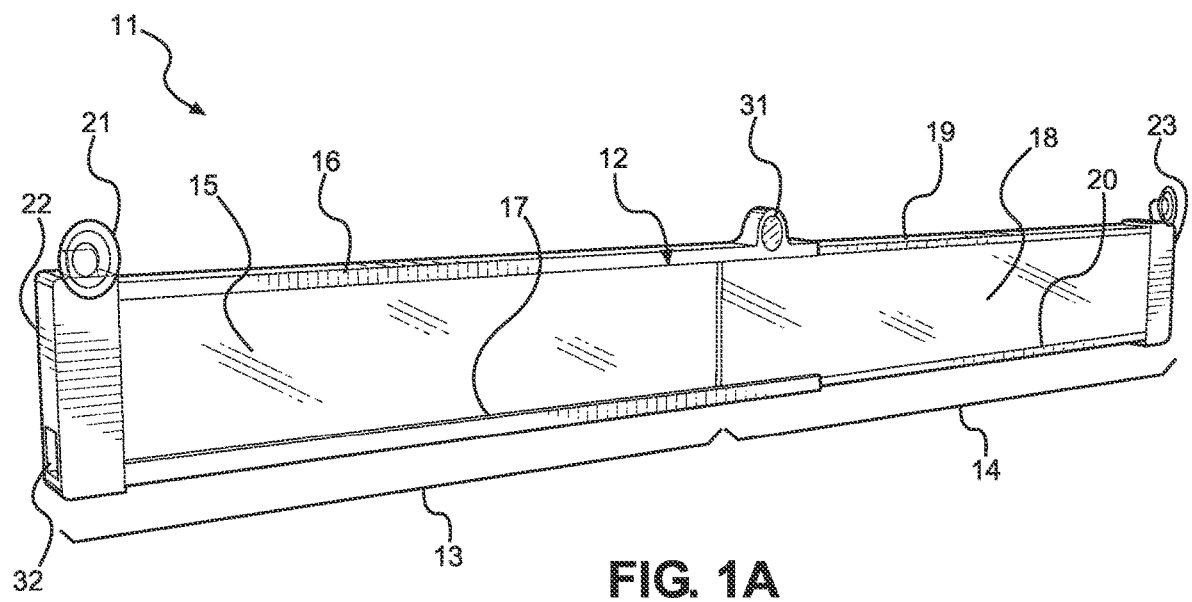
FIG. 1A shows a perspective view of an embodiment of the vehicle communication system in an extended position.

Reference is made herein to the attached drawings. Like reference numerals are used throughout the drawings to depict like or similar elements of the vehicle communication system. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As referred to herein, the term "electronic device" refers to any computing device that includes at least a display screen and an input mechanism. The computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can be desktop computer systems, laptops, cell phones, tablets, networking devices, or any other device that incorporates hard-wired and/or program logic to implement the techniques and other features of the present disclosure.

Figure 1B:
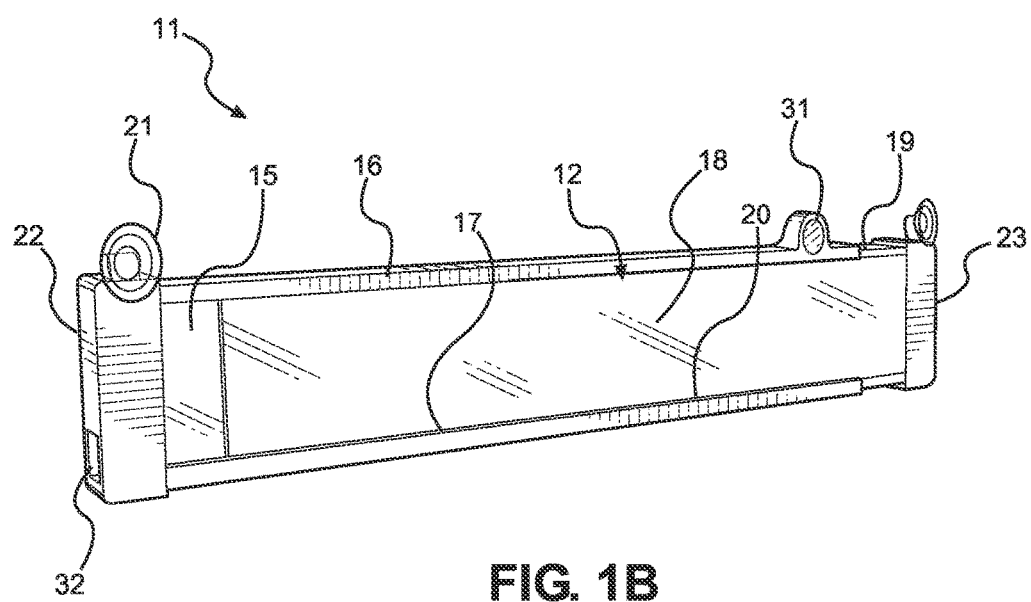
FIG. 1B shows a perspective view of an embodiment of the vehicle communication system in a collapsed position.

Referring now to FIGS. 1A and 1B, there is shown a perspective view of an embodiment of the vehicle communication system in an extended position and a perspective view of an embodiment of the vehicle communication system in a collapsed position, respectively. The vehicle communication system 11 comprises a housing 12 having a first portion 13 slidably affixed to a second portion 14. The first portion 13 comprises a first display 15 affixed between a first upper arm 16 and a first lower arm 17. Similarly, the second portion 14 comprises a second display 18 affixed between a second upper arm 19 and a second lower arm 20. The first and second displays 15, 18 are configured to display text or an image thereon, such that a user can communicate with other drivers in the vicinity. A fastener 21 is affixed to each of a first end 22 of the housing 12 and a second end 23 of the housing 12, wherein the fastener 21 is configured to removably secure the housing 12 to a vehicle window.

The first upper arm 16 is slidably affixed to the second upper arm 19 and the first lower arm 17 is slidably affixed to the second lower arm 20, such that the housing 12 is selectively movable between an extended position (as shown in FIG. 1A) and a collapsed position (as shown in FIG. 1B). In the extended position, a linear distance between the first end 22 and the second end 23 is greater than when the housing 12 is in the collapsed position. In this manner, the user can selectively expand or collapse the housing 12 across a variety of lengths, such that the user can adjust the size of the housing 12 to fit within a particular vehicle's rear window. In some embodiments, the first and second upper arms 16, 19 and the first and second lower arms 17, 20 each comprise a track system thereon, such that the track system facilitates the movement of the first portion 13 relative to the second portion 14. In the illustrated embodiment, the first display 15 and the second display 18 are disposed along distinct parallel planes, such that when the first portion 13 is moved towards the collapsed position, the first and second displays 15, 18 do not contact each other. In the shown embodiment, the first display 15 is disposed rearward relative to the second display 18, such that the first display 15 is disposed behind the second display 18 when the housing 12 is in the collapsed position.

Figure 3:
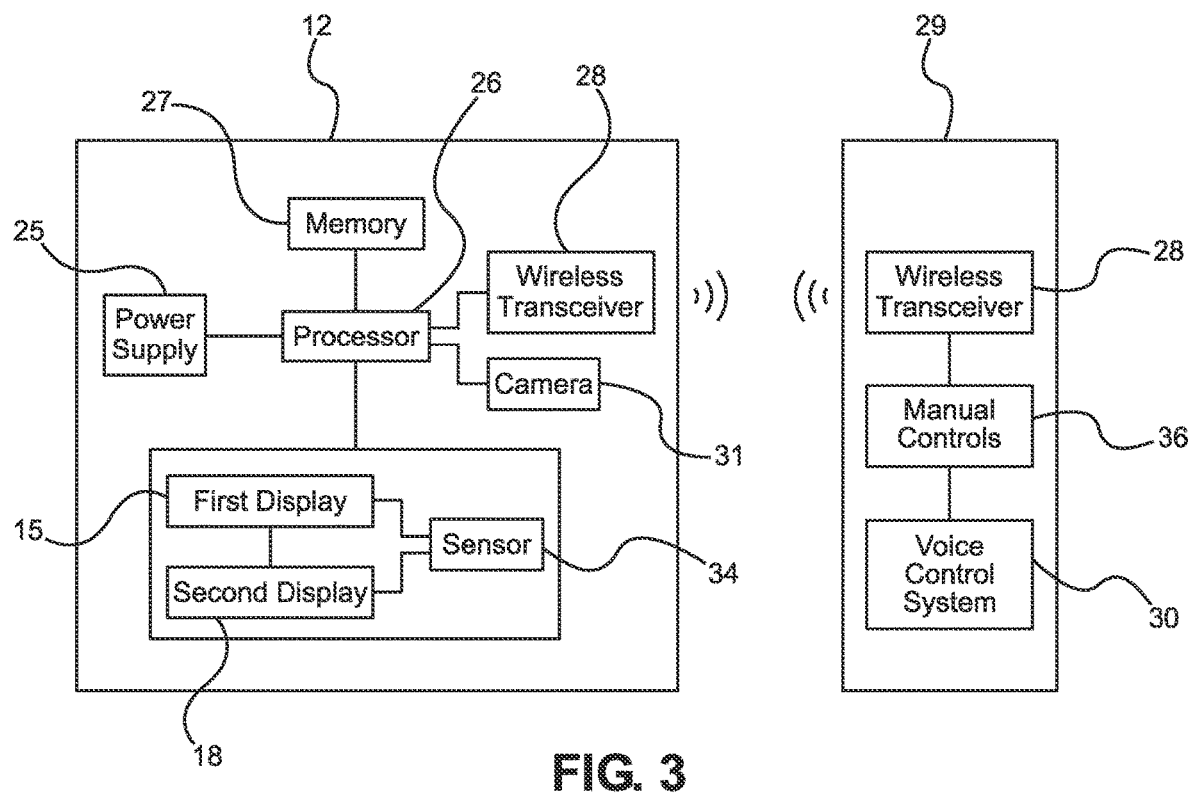
FIG. 3 shows a schematic diagram of an embodiment of the vehicle communication system.

In the illustrated embodiment, the housing 12 further comprises a connection port 32 disposed on the first end 22 of the housing 12. The connection port 32 is contemplated to include a variety of connection means, such as a USB port, to allow a user to operably connect the housing 12 to an external device (shown in FIG. 3, 29). In this manner, the user can control the message displayed on the first and second displays 15, 18 via the external device. Alternatively, the user can upload a variety of pre-programmed messages onto an onboard memory (as shown in FIG. 3, 27) to select from via the connection port 32. Furthermore, in the shown embodiment, a camera 31 is disposed on a distal end of the first upper arm 16 opposite the first end 22. The camera 31 can be configured to record images or video from the surrounding area behind the user's vehicle, such that the user can identify when a vehicle is within range to read a message displayed by the vehicle communication system 11.

Figure 2:
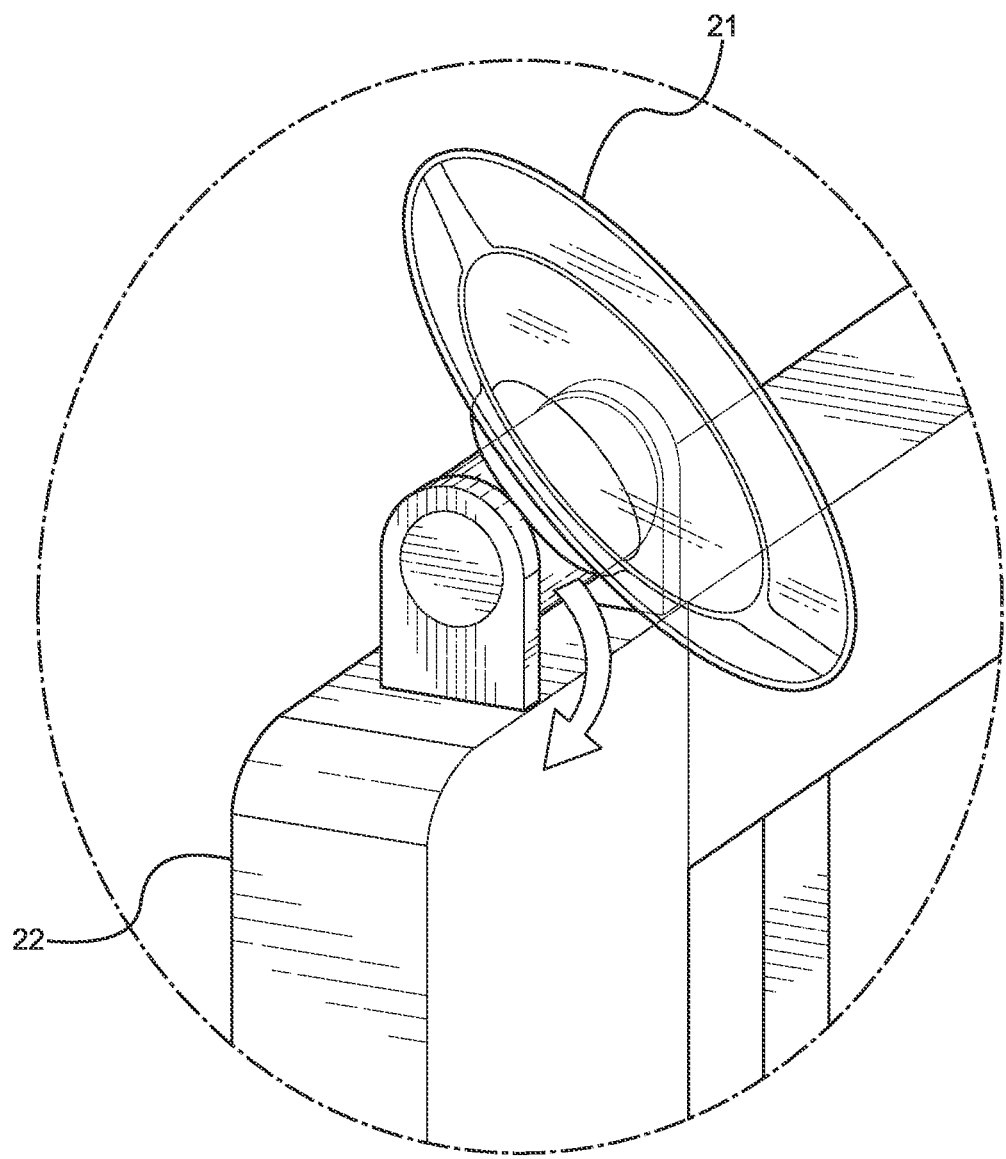
FIG. 2 shows a close-up view of the fastener of an embodiment of the vehicle communication system.

Referring now to FIG. 2, there is shown a close-up view of the fastener of an embodiment of the vehicle communication system. In the illustrated embodiment, the fastener 21 is pivotally affixed to the housing. In this manner, the user can selectively adjust the angle of the housing relative to the rear vehicle window to ensure that vehicles in the surrounding area can readily read the message displayed thereon. In the shown embodiment, the fastener 21 is disposed on each of the first end 22 and the second end to provide securement to a vehicle window at two points. In alternate embodiments, the fastener 21 is contemplated to be disposed on each of an upper side of the first end 22 and the second end and a lower side of the first end 22 and the second end. In this manner, the housing is further secured to a vehicle window via four points of contact. Similarly, this can serve to maintain the proper alignment of the housing relative to the vehicle window as bumps or other impacts during use prevent the fastener 21 from pivoting during use. In the shown embodiment, the fastener 21 comprises a suction cup, however, in alternate embodiments, other fastening means are contemplated.

Referring now to FIG. 3, there is shown a schematic diagram of an embodiment of the vehicle communication system. In the shown embodiment, the housing 12 further comprises control circuit therein comprising a processor 26 operably connected to a power supply 25 and the memory 27. The memory 27 is configured to store a variety of messages thereon, wherein each message can be selected to be displayed across the first and second displays 15, 18. Furthermore, in the shown embodiment, a wireless transceiver 28 is disposed within the housing 12, such that the housing 12 can wirelessly communicate with an external device 29. The external device 29 can include manual controls 36 or a voice control system 30 therein, such that the user can input a variety of messages on the external device 29 to be transmitted to the housing 12 via the wireless transceiver 28. In some embodiments, the external device 29 comprises an onboard vehicle control system disposed on the vehicle dashboard. In this way, the user need only pair the housing 12 with the vehicle to allow the user to operate the system with onboard controls disposed within the dashboard. The voice control system 30 allows a user to program new messages while actively driving the vehicle without taking focus off of the road. Once transmitted to the housing, the remotely programmed messages can be stored on the memory 27 such that the processor 26 can retrieve a particular message to display across the first and second displays 15, 18. In the shown embodiment, the external device 29 can further comprise an application thereon, wherein the application displays each message disposed on the memory 27 to allow a user to quickly and easily select a particular message to display. In an alternate embodiment, the external device 29 can be directly connected to the housing 12 via the connection port, thereby preventing the user from attempting to input new messages while actively driving a vehicle.

In the shown embodiment, the housing 12 further comprises the camera 31 thereon, wherein the camera 31 is configured to record images or video from the rear of the vehicle. In this embodiment, the video or image feed from the camera 31 can be transmitted to the external device 29 to be displayed thereon. In this manner, the user can monitor the area behind the vehicle to ensure that the message displayed by the vehicle communication system is within viewing distance of a desired recipient.

In the illustrated embodiment, the first and second displays 15, 18 are further operably connected to a sensor 34, wherein the sensor 34 is configured to detect any overlap between the first display 15 and the second display 18, such as when the housing 12 is in a collapsed position. Upon detection of the first and second displays 15, 18 overlapping, the processor 26 is configured to disable a portion of the first or second display 15, 18 that is positioned behind the other display. For example, in the embodiment shown in FIGS. 1A and 1B, a portion of the first display 15 that is positioned behind the second display 18 is disabled by the processor 27 once the sensor 34 detects that the portion is no longer visible. In this manner, the message properly displays in a contiguous manner across both of the first and second displays 15, 18.

Figure 4:
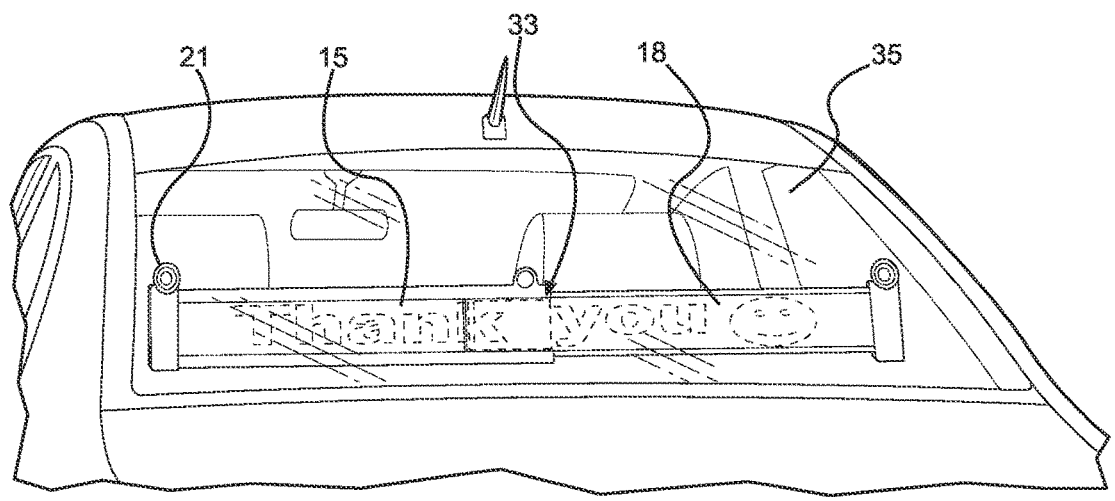
FIG. 4 shows a perspective view of an embodiment of the vehicle communication system in use.

Referring now to FIG. 4, there is shown a perspective view of an embodiment of the vehicle communication system in use. In one use, the housing is affixed to a rear vehicle window 35 via the fasteners 21. The user can adjust the angle of the housing relative to the rear vehicle window 35 in embodiments having pivotally affixed fasteners 21. When a driver wishes to display a message across the first and second displays 15, 18, the user can select a desired message to be displayed. In some embodiments, the message can be selected by an external device either in wireless communication with the vehicle communication system, or directly in wired communication via the connection port. In the shown embodiment, a portion 33 of the first display 15 is disposed behind the second display 18. As previously described, upon detection of the portion 33 behind the second display 18, the portion 33 can be disabled to prevent sections of the message displayed across the first and second displays 15, 18 being cutoff by the relative positions of the displays 15, 18. In this manner, a user can easily and efficiently communicate with vehicles in the surrounding area while driving.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A vehicle communication system, comprising:
 a housing having a first portion slidably affixed to a second portion;
 wherein the first portion comprises a first upper arm and a first lower arm perpendicularly affixed to a first end of the housing;
 wherein the second portion comprises a second upper arm and a second lower arm perpendicularly affixed to a second end of the housing;
 a first display affixed between the first upper arm and the first lower arm of the first portion;
 a second display affixed between the second upper arm and the second lower arm of the second portion;
 wherein the second upper arm is slidably disposed within a track disposed on a lower side of the first upper arm and the second lower arm is slidably disposed within a track disposed on an upper side of the first lower arm;
 wherein the first display and the second display are disposed along distinct parallel planes, such that the first portion and the second portion can selectively move between an extended position and a collapsed position;
 whereupon movement to the collapsed position, a portion of the first display is positioned behind the second display;
 a fastener disposed on each of the first end of the housing and the second end of the housing;
 a control circuit including a power supply, a processor, and a memory disposed within the housing;
 wherein the first and second displays are configured to display a message stored on the memory across the first and second displays;
 a sensor configured to detect a length of the portion of the first display, such that the portion can be disabled by the control circuit, whereupon the message is adjusted to display contiguously across an enabled portion of both of the first and second displays.

2. The vehicle communication system of claim 1, wherein the control circuit further comprises a wireless transceiver in operable communication with an external device, wherein the external device is configured to select a message from the memory to display.

3. The vehicle communication system of claim 2, wherein the memory is configured to receive a message input from the external device, wherein the message input is transmitted to the display.

4. The vehicle communication system of claim 3, wherein the external device further comprises a voice control system configured to translate a voice command into the message input for display.

5. The vehicle communication system of claim 1, wherein the fastener comprises a suction cup.

6. The vehicle communication system of claim 1, further comprising a camera disposed on the first upper arm of the housing, the camera operably connected to the control circuit.

7. The vehicle communication system of claim 6, wherein the camera is configured to transmit images and video recorded thereby to an external device.

8. The vehicle communication system of claim 1, further comprising a connection port on the housing, wherein the connection port is configured to operably connect the housing to the external device.

9. A vehicle communication system, comprising:
a housing having a first portion slidably affixed to a second portion;
wherein the first portion comprises a first upper arm and a first lower arm perpendicularly affixed to a first end of the housing;
wherein the second portion comprises a second upper arm and a second lower arm perpendicularly affixed to a second end of the housing;
a first display affixed between the first upper arm and the first lower arm of the first portion;
a second display affixed between the second upper arm and the second lower arm of the second portion;
wherein the second upper arm is slidably disposed within a track disposed on a lower side of the first upper arm and the second lower arm is slidably disposed within a track disposed on an upper side of the first lower arm;
wherein the first display and the second display are disposed along distinct parallel planes, such that the first portion and the second portion can selectively move between an extended position and a collapsed position;
whereupon movement to the collapsed position, a portion of the first display is positioned behind the second display;
a fastener pivotally affixed to each of the first end of the housing and the second end of the housing;
a control circuit including a power supply, a processor, and a memory disposed within the housing;
wherein the first and second displays are configured to display a message stored on the memory across the first and second displays;
a sensor configured to detect a length of the portion of the first display, such that the portion can be disabled by the control circuit, whereupon the message is adjusted to display contiguously across an enabled portion of both of the first and second displays.

10. The vehicle communication system of claim 9, wherein the control circuit further comprises a wireless transceiver in operable communication with an external device, wherein the external device is configured to select a message from the memory to display.

11. The vehicle communication system of claim 10, wherein the memory is configured to receive a message input from the external device, wherein the message input is transmitted to the display.

12. The vehicle communication system of claim 11, wherein the external device further comprises a voice control system configured to translate a voice command into the message input for display.

13. The vehicle communication system of claim 9, wherein the fastener comprises a suction cup.

14. The vehicle communication system of claim 9, further comprising a camera disposed on the first upper arm of the housing, the camera operably connected to the control circuit.

15. The vehicle communication system of claim 14, wherein the camera is configured to transmit images and video recorded thereby to an external device.

16. The vehicle communication system of claim 9, further comprising a connection port on the housing, wherein the connection port is configured to operably connect the housing to the external device.

* * * * *